United States Patent [19]

Kaiser

[11] Patent Number: 5,339,284
[45] Date of Patent: Aug. 16, 1994

[54] SIGNAL PROCESSOR FOR ELIMINATION OF SIDELOBE RESPONSES AND GENERATION OF ERROR SIGNALS

[75] Inventor: Julius A. Kaiser, Kinsington, Md.

[73] Assignee: Frederick Herold & Associates, Inc., Greenbelt, Md.

[21] Appl. No.: 914,624

[22] Filed: Jul. 17, 1992

[51] Int. Cl.$^5$ ............................................. G01S 15/00
[52] U.S. Cl. .................. 367/103; 367/905; 342/379
[58] Field of Search ............... 367/905, 100, 103, 124; 343/844; 342/368, 379, 382

[56] References Cited

U.S. PATENT DOCUMENTS

| | | |
|---|---|---|
| 3,042,916 | 7/1962 | Clarke . |
| 3,268,890 | 8/1966 | Birge . |
| 4,173,759 | 11/1979 | Bakhru . |
| 4,213,131 | 7/1980 | Kaiser, Jr. .......................... 343/844 |
| 4,495,502 | 1/1985 | Masak . |
| 4,498,083 | 2/1985 | Gutleber . |
| 4,500,883 | 2/1985 | Gutleber . |
| 4,525,716 | 6/1985 | Carlin . |
| 4,577,193 | 3/1986 | Kiuchi et al. . |
| 4,717,919 | 1/1988 | Cherrette et al. . |
| 4,720,712 | 1/1988 | Brookner et al. . |
| 4,734,701 | 3/1988 | Grobert . |

OTHER PUBLICATIONS

Brookner, *Radar Technology*, ©1977 Artech House, Inc., Ch. 21, pp. 289–335.

Kaiser, J., "Single beam synthesis from thinned arrays," *J. Acoust. Soc. Am.*, vol. 76(2), Aug. 1984, pp. 465–474.

Primary Examiner—Daniel T. Pihulic
Attorney, Agent, or Firm—Lowe, Price, LeBlanc & Becker

[57] ABSTRACT

A signal processor eliminates sidelobe response from signals produced by a spaced antenna array that forms a single beam using spatial frequencies. The signal processor also produces error signals. The signal processor uses a phase coherent local oscillator to simultaneously convert the wavefront signal from each element of the antenna array to three different first intermediate frequency signals IF. The first IF signals of each element are cross-correlated with the first IF signals from each of the other array elements to form the signals containing sampled spatial frequency components $IF_2$. Cross-correlating a second time using the sampled spatial frequencies as inputs produces signals containing derived spatial frequency components $IF_3$. The signals containing derived spatial frequency components are synchronously detected (phase compared) and summed to provide a single beam output signal. The summed output signal passes through a linear peak detector biased to the peak of the largest even sidelobe such that only signals within the main beam and above the bias level appear in the final output. The derived spatial frequencies are also phase shifted by 90° and detected signals containing "imaginary" spatial frequency components. The sum of the signals with imaginary components represents an error pattern. Also, summation of the signals with imaginary components for the odd order spatial frequency harmonics produces an error signal approximating a signum function of the angle of incidence of the incoming wavefront.

27 Claims, 10 Drawing Sheets

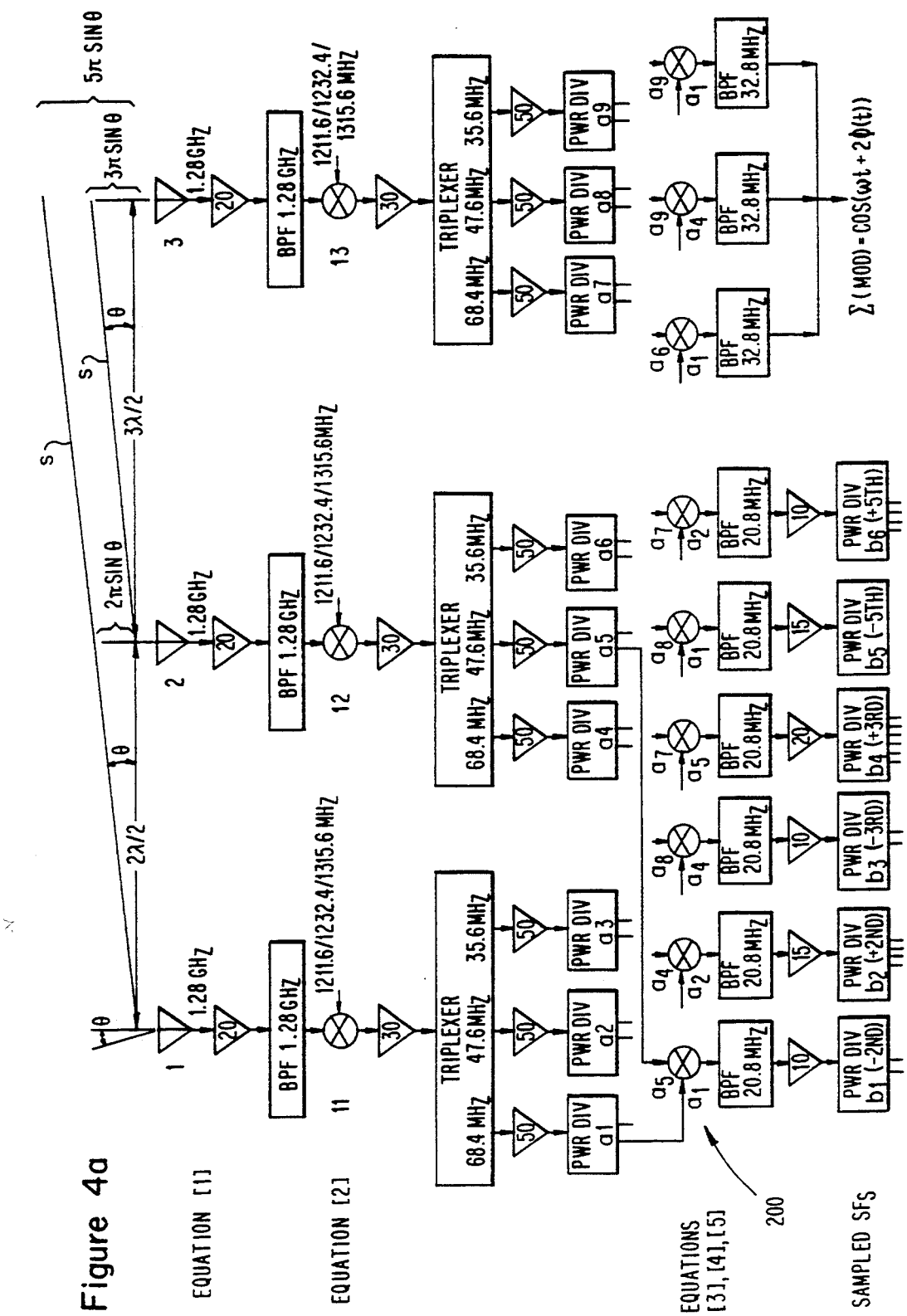

| SAMPLED SFs | DERIVED SFs |
|---|---|
| ±2 | 0 = + 3 − 3 |
| ±3 | 1 = + 3 − 2 |
| ±5 | 2 = + 5 − 3 |
|  | 3 = + 5 − 2 |
|  | 4 = + 2 + 2 |
|  | 5 = + 3 + 2 |
|  | 6 = + 3 + 3 |
|  | 7 = + 5 + 2 |
|  | 8 = + 5 + 3 |

Figure 5

SIGNAL PROCESSOR FOR ELIMINATION OF SIDELOBE RESPONSES AND GENERATION OF ERROR SIGNALS

TECHNICAL FIELD

The present invention generally relates to phased antenna arrays that are used for determining the direction of arrival of electromagnetic or acoustic signals, and more particularly to arrays where spatial frequencies are individually processed in the course of determining signal direction. The signal processing techniques described herein may be applied to an array of widely spaced antenna elements in order to form a single beam that is without sidelobes or grating lobes and that is readily scannable, and in order to form stand-alone error signals with nulls that can be scanned independently of the scan pattern.

BACKGROUND ART

Phased arrays of widely spaced antenna elements can be used to determine the direction of arrival of electromagnetic or acoustic signals. In such arrays, the spatial frequency signals are individually processed in the course of determining signal direction to form a single, scannable beam.

U.S. Pat. No. 4,213,131 discloses the basic techniques used in forming single beams using spatial frequencies. This prior patent teaches conversion of each antenna element signal to two or more different first intermediate frequency signals using coherent local oscillators. The intermediate frequency signals are mixed with intermediate frequency signals of other antenna elements to form second intermediate frequency signals. The patent further teaches mixing pairs of selected second intermediate frequency signals to produce third intermediate frequency signals representing a complete set of continuous spatial harmonics. A set of odd spatial harmonics is summed to produce the "single beam" output. The signal processing system disclosed in the prior patent did not eliminate responses to sidelobes and provided no formation of error pattern signals.

Sidelobes are a natural phenomenon associated with all collimating systems, e.g., phased arrays, reflectors, lenses, horns, i.e., antennas. Sidelobe responses introduce ambiguities and interference. In conventional antenna systems, where the spatial frequencies are summed prior to the detection process, a signal's carrier is effectively amplitude modulated in the antenna's output as the signal sweeps through the radiation pattern, i.e. through the "$\theta$" plane of the antenna.

Conventional phased array systems do not process the spatial frequencies prior to detection and summing, and sidelobe responses cannot readily be eliminated. Even in non-conventional phased array systems such as that described in U.S. Pat. No. 4,213,131, where the spatial frequencies are processed prior to detection and summing, sidelobe responses are not specifically eliminated.

SUMMARY OF THE INVENTION

The objective of this invention to provide a scannable beam-forming array system which uses signal processing techniques that eliminate all ambiguities and interference normally encountered through sidelobe responses.

Another objective of the invention is to provide a scannable beam-forming system which uses signal processing techniques which generate error pattern signals with nulls in the direction of the signal.

A further objective is to develop a scannable beam signal and an error signal which can be used to control tracking of the source of an incoming wavefront.

In the present invention, a signal processor forms a single scannable beam from signals produced by spaced elements of an antenna array by deriving and processing signals containing "real" spatial frequency components. The processor eliminates sidelobe responses from the resultant scannable beam signal. The signal processor also forms error pattern signals by processing signals containing "imaginary" spatial frequency components.

Thus in a first aspect, the present invention provides a method and apparatus for eliminating sidelobe responses from a single beam output signal derived from received wavefront signals produced by an antenna array of spaced antenna elements. Wavefront signals from pairs of elements of the antenna array are processed to produce signals containing sampled spatial frequency components. These sampled spatial frequency components relate to the signals received by actual interferometer pairs of the antenna elements. In the preferred embodiments, the received wavefront signals from the elements of the antenna array are each converted to signals of at least two different intermediate frequencies. The signal of a first intermediate frequency from each antenna element is cross-correlated with the signals of a second intermediate frequency from each of the other array elements to form the desired signals containing sampled spatial frequency components. The signal processor cross-correlates selected pairs of the signals containing sampled spatial frequency signals. This second correlation produces signals containing derived spatial frequency components. The "derived" components correspond to spatial frequency measurements which would be produced by interferometer pairs not actually present in the antenna array. In this first aspect, the invention next derives a single beam output signal from the signals containing derived spatial frequency components. The invention then eliminates sidelobe responses from the single beam output signal.

In preferred embodiments, the signals having derived spatial frequency components are synchronously converted to corresponding baseband signals and summed to produce the single beam output signal. A linear peak detector biased to the peak of the largest even sidelobe response passes only portions of the single beam output signal within the main lobe of the beam and above the bias level, to thereby eliminate the sidelobe responses from the final output.

In a second aspect, the present invention provides a method and apparatus for forming an error signal from signals produced by an antenna array of spaced antenna elements using spatial frequency processing techniques. Wavefront signals from pairs of elements of the antenna array are processed to produce signals containing sampled spatial frequency components corresponding to actual interferometer pairs. Selected pairs of the signals containing sampled spatial frequency signals are cross-correlated to produce derived spatial frequency signals. The preferred embodiments of the processing of the received wavefront signals and the signals containing sampled spatial frequencies are essentially similar to those used in the preferred embodiment of the first aspect of the invention discussed above. In this second aspect, however, the invention next derives signals containing "imaginary" spatial frequency components from the signals containing derived spatial frequency components. An error pattern signal is derived from the signals containing imaginary spatial frequency components. The sum can include all "imaginary" spatial frequency harmonics, or just the odd harmonics of the imaginary spatial frequencies.

In preferred embodiments which generate the error pattern signals, the signals with imaginary spatial frequency components are produced by synchronously converting the signals containing derived spatial frequency components to corresponding baseband signals, and introducing a 90° phase shift. The invention then derives the error pattern signal by summing the signals containing imaginary spatial frequency components.

The preferred embodiment of the signal processor of the present invention uses phase coherent local oscillators to simultaneously convert the wavefront signal from each element of a thinned antenna array to three different first intermediate frequency (IF) signals. The first IF signals of each element are cross-correlated with the first IF signals from other selected elements of the array to form the signals having sampled spatial frequency components $IF_2$ corresponding to actual interferometer pairs of the antenna elements. Cross-correlating a second time using the signals containing sampled spatial frequency components as inputs produces signals with derived spatial frequency components $IF_3$ for phantom interferometer pairs not actually present in the array. The signals with derived spatial frequency components are synchronously detected (phase compared, both real and imaginary). The real components of the detected signals are summed to provide a single beam output signal in a manner similar to that taught by U.S. Pat. No. 4,213,131. This output signal, however, includes the usual sidelobe responses. The summed output signal of all components passes through a linear peak detector. The linear peak detector is biased to the peak of the largest even sidelobe such that only signals within the main beam and above the bias level appear in the final output. The sum of the imaginary components results in error signals.

In one embodiment, the invention forms two error signals for controlling an antenna tracking system. One error signal consists of the sum of all signals containing the imaginary spatial frequency components. The other error signal is the sum of weighted signals containing odd harmonic spatial frequency components. The single beam output signal is used to select one of the two error signals based on the currently detected angle of the incoming signals.

The invention extends the basic techniques for forming single beams using spatial frequencies, as described in U.S. Pat. No. 4,213,131, to include elimination of responses to sidelobes and to generate error signals. In the signal processing techniques of U.S. Pat. No. 4,213,131, a scannable beam is developed where signal modulation that may accompany the desired carrier is removed in the signal processing. The present description treats the more general case where modulation accompanying the carrier is present.

In conventional antenna systems, considerations for transmission and reception are identical. In the present instance, the elimination of sidelobe response defines a signal processing technique that applies to reception only because of non-linear actions employed. Instead of summing the signals with spatial frequency components prior to the detection process, in the present embodiment, the signals having spatial frequency components are each processed prior to detection and summing, thereby providing phase modulation of the signal in the $\theta$ plane. It is this characteristic that leads to elimination of sidelobe response through signal processing and the generation of error signals.

In addition, the invention provides an appropriate source of coherent local oscillator signals which allows retention of all previously described system advantages.

The signal processing of antenna signals in the present invention has a variety of uses, for example in acoustic or in RF type tracking applications. Preferred embodiments operate on radio signals. One RF application of the invention relates to directional tracking of a satellite in a personal communication system. Personal communication systems can provide users with diversified voice communication services, instant access to various data bases, intersystem data connectivity, etc., and can provide all of these services on a mobile basis. Many of these systems communicate via satellite.

The satellite used in such a personal communication system will be in low earth orbit and will employ wide beam antennas for transmission and reception. Handheld or portable personal communications terminals, for use in such a satellite system, therefore need small directive tracking antennas. The signals produced by the present invention can be used to control antenna tracking in the portable personal communications terminals. In such an application, the antennas are mounted on a substrate, approximately six by four by one inches, with the transmit/receive electronics mounted on the reverse side of the substrate. The phase generation electronics are external to the transmit receive electronics and should not exceed six cubic inches.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The invention will be better understood from the following detailed description of the preferred embodiments which makes reference to the accompanying drawings, in which:

FIGS. 4a and 4b together loren a functional block diagram of a signal processing system using a three element array, in accord with the present invention.

FIG. 5 is a table showing the spatial frequencies derived from a three element array type system, such as that of FIG. 4.

DESCRIPTION OF THE PREFERRED EMBODIMENTS

Frequency is the inverse of the period of a waveform, where period relates to time. Typically, the term "frequency" refers to the number of waves per unit of time, e.g. cycles per second. The term "spatial frequency" has been developed to express a similar relationship between wavelength and distance. The spatial frequency is still the inverse of a period, but now the period is that of the wave defined in terms of a spatial angle (distance) instead of time. Thus, spatial frequencies would be described in cycles per unit angle. Virtually any waveform can be transformed into a number of sine waves of specified frequencies, For example a square wave pulse signal can be expressed in terms of its transform frequencies and the weighting factors for each frequency component. Similarly, the direction of the received signal can be expressed in terms of its transform into the spatial frequency domain.

Spatial frequencies (SF's) of a received signal are measured with interferometer pairs. The wider the separation of the interferometer pair, the higher the measured SF. For example, the fundamental SF is measured by a pair with a one-half wavelength spacing, the second harmonic SF is measured by a pair with one wavelength separation, etc. Spatial frequency units are expressed in cycles per $\pi$ radians, i.e., cycles per hemisphere. Ultimate resolution of an aperture formed by an antenna array is circumscribed by the highest SF available from the aperture.

It is the aperture illumination functions (Equations [3] and [4] to be discussed below) which produce grating lobes in space from a given interferometer pair of antenna elements. A change in the spatial angle $\theta$ is manifested as a change in phase, there being a 360° phase change per grating lobe. The number of 360° phase cycles occurring within $-90° \leq \theta \leq 90°$ is interpreted as the "spatial frequency" and is defined by the expression $\cos(2\pi D/\lambda \sin\theta)$. In this expression, D is the spacing between elements of the pair, $\lambda$ is the wavelength of the received signal, and $\theta$ is the spatial angle of the incoming signal direction measured with respect to a line normal to the line between the elements of the interferometer pair. The aperture variable $D/\lambda$ represents the spatial frequency argument. Since spatial frequency harmonics occur at one-half wavelength spacings, an interferometer pair having a given value for $D/\lambda$ measures a corresponding spatial frequency of an order twice the value of $D/\lambda$; e.g., if $D=\lambda$, then $D/\lambda=1$ and the pair measures the second order spatial frequency; if $D=3\lambda/2$, then $D/\lambda=3/2$ and the pair measures the third order spatial frequency, etc. In the spatial frequency expression, $2\pi D/\lambda \sin\theta$ represents the phase delay of the incoming wavefront in reaching each element of the interferometer pair.

Figure 1:
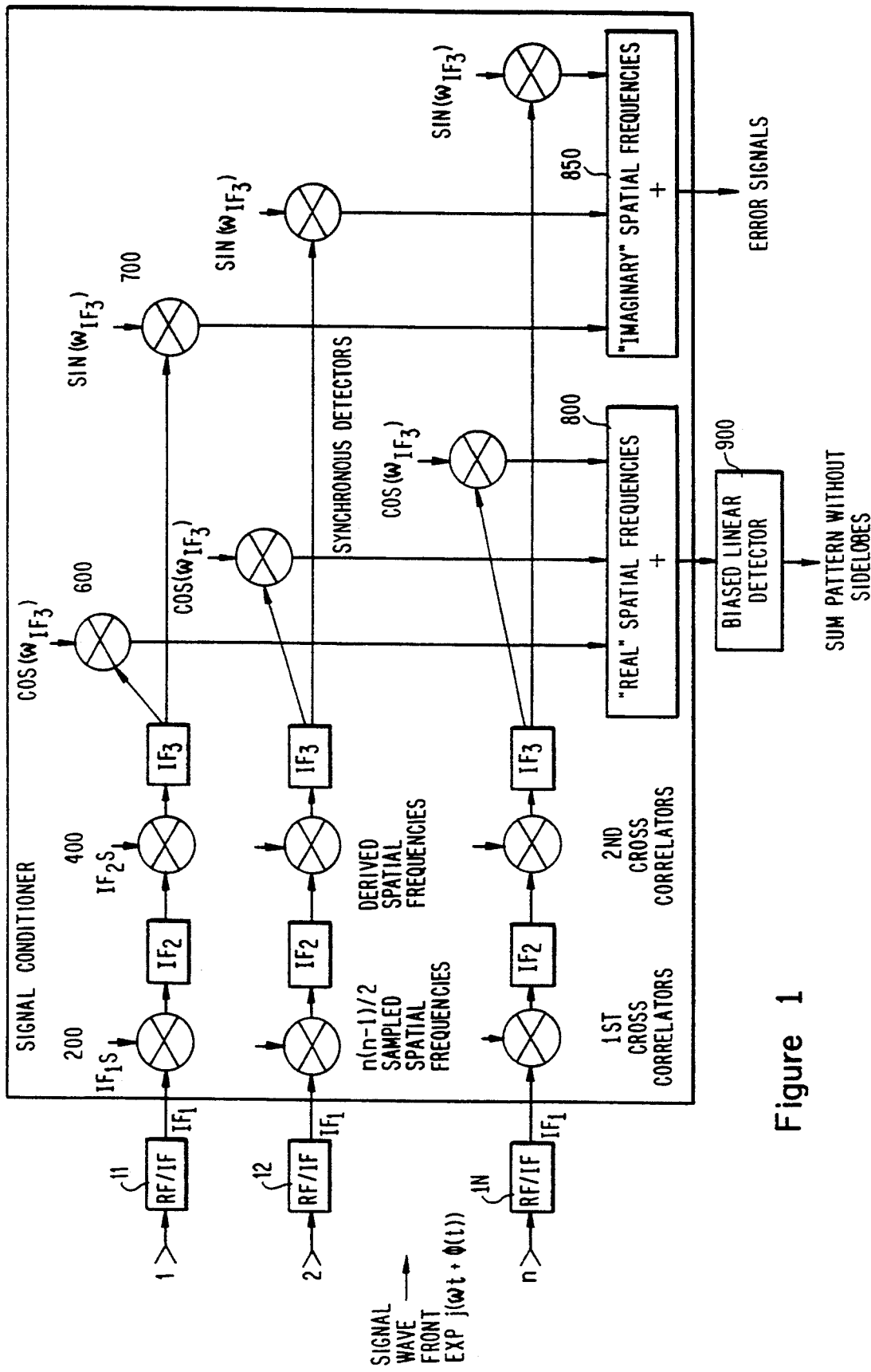
FIG. 1 is a functional schematic of a signal processing system and an n element array according to the present invention.

The antenna array shown in FIG. 1 includes elements 1 to n. The number of elements present in the array can be as few as three (see FIG. 4a) or some larger number. The signals from the antenna elements will be processed in selected pairs, as discussed below. In the drawings, the elements forte a linear array. The invention, however, may be expanded to process signals from two linear arrays at right angles to each other, to provide tracking signals for angles in two orthogonal directions.

FIG. 1 shows an aperture of n antenna elements, with non-uniform multiples of half-wavelength spacings between the elements of the array. Using conventional cross-correlation techniques, the n selected elements permit the simultaneous sampling of $n(n-1)/2$ different SF's. Using cross-correlation techniques a second time, the selected set of sampled SF's is used to synthesize up to $[n(n-1)]^2/2 + n(n-1)/2$ integer SF's where some are duplicates and others are non-contiguous. This "thinned array" type processing technique requires far fewer antenna elements to produce the number of SF's necessary for a given resolution. There is, however, a large number from 0 to N of contiguous spatial frequencies remaining which behave as though they had been generated by a line source of $2N+1$ elements with uniform $\lambda/4$ spacings. Since this spectrum of SF's represents a uniform aperture illumination, their summation produces a single unambiguous beam approximately 101°/N wide with the usual sidelobe structure. Further processing, to be shown, eliminates output responses to those sidelobes and in addition, generates error signals with a null in the direction of the signal, a positive voltage in one direction from the signal and a negative voltage in the opposite direction.

The initial signal processing is similar to that described in U.S. Pat. No. 4,213,131. The signal from each antenna element is RF amplified and converted simultaneously, using phase coherent local oscillator signals. In the preferred embodiment of the present invention, each antenna signal is converted to three different first intermediate frequencies (see FIG. 2A); however, conversion to two intermediate frequencies is sufficient for many applications. The three local oscillator frequencies are typically selected such that two are below the received signal frequency and the third is above the received signal frequency. These first IF's are selectively cross-correlated to form the sampled spatial frequency signals for individual interferometer pairs. In a preferred embodiment discussed later with regard to FIG. 4a and 4b, cross-correlation of selected first IF signals also forms modulation products.

In the specific processing circuit of FIG. 1, the signal from each antenna element passes through an RF/IF processing section 11, 12, 1N to perform the requisite conversion to first intermediate frequency signals. Specifically, the RF/IF processing section 11, 12, 1N amplifies and filters the signal and then multiplies the signal from the corresponding antenna element 1, 2, N by a signal containing phase coherent components at two or three local oscillator frequencies (LO).

The IF/RF sections 11 to 1N thus convert the wavefront signal from each element of the thinned antenna array to at least two first intermediate frequency (IF) signals referred to as $IF_1$'s. The signals at the first intermediate frequencies ($IF_1$'s) for each element are cross-correlated with the first intermediate frequency signals from other selected elements of the array to form the signals at the second intermediate frequencies (IF$_2$'s) which contain sampled spatial frequency components corresponding to interferometer pairs of the antenna elements. Specifically, the mixers 200 receive the IF$_1$ signals in such a manner as to define interferometer pairs in the antenna array. For each possible pairing of the elements, one of the mixers 200 multiplies the IF$_1$ signal from one element at a first of the intermediate frequencies with the IF$_1$ signal for the other element of the pair at the second of the intermediate frequencies. For each possible pairing, another of the mixers 200 multiplies the IF$_1$ signal from one element at the second of the intermediate frequencies with the IF$_1$ signal for the other element of the pair at the first of the intermediate frequencies. This first cross correlation in mixers 200 produces a series of IF$_2$ signals which include sampled spatial frequency components. Thus the "sampled" spatial frequency components correspond to spatial frequencies measured by actual interferometer pairs present in the antenna array.

The IF$_2$ signals which include the sampled spatial frequency components are cross-correlated in mixers 400 to produce signals IF$_3$ which include derived spatial frequency components. The term "derived" here means that the spatial frequency components correspond to frequencies measured by interferometer pairs which are not actually present in the antenna array. The mixers 400 multiply signals IF$_2$, including sampled spatial frequency components, selected to produce derived spatial frequency components as though measured by interferometer pairs of a line of 2N+1 elements uniformly spaced apart by a distance of $\theta/4$.

Figure 7:
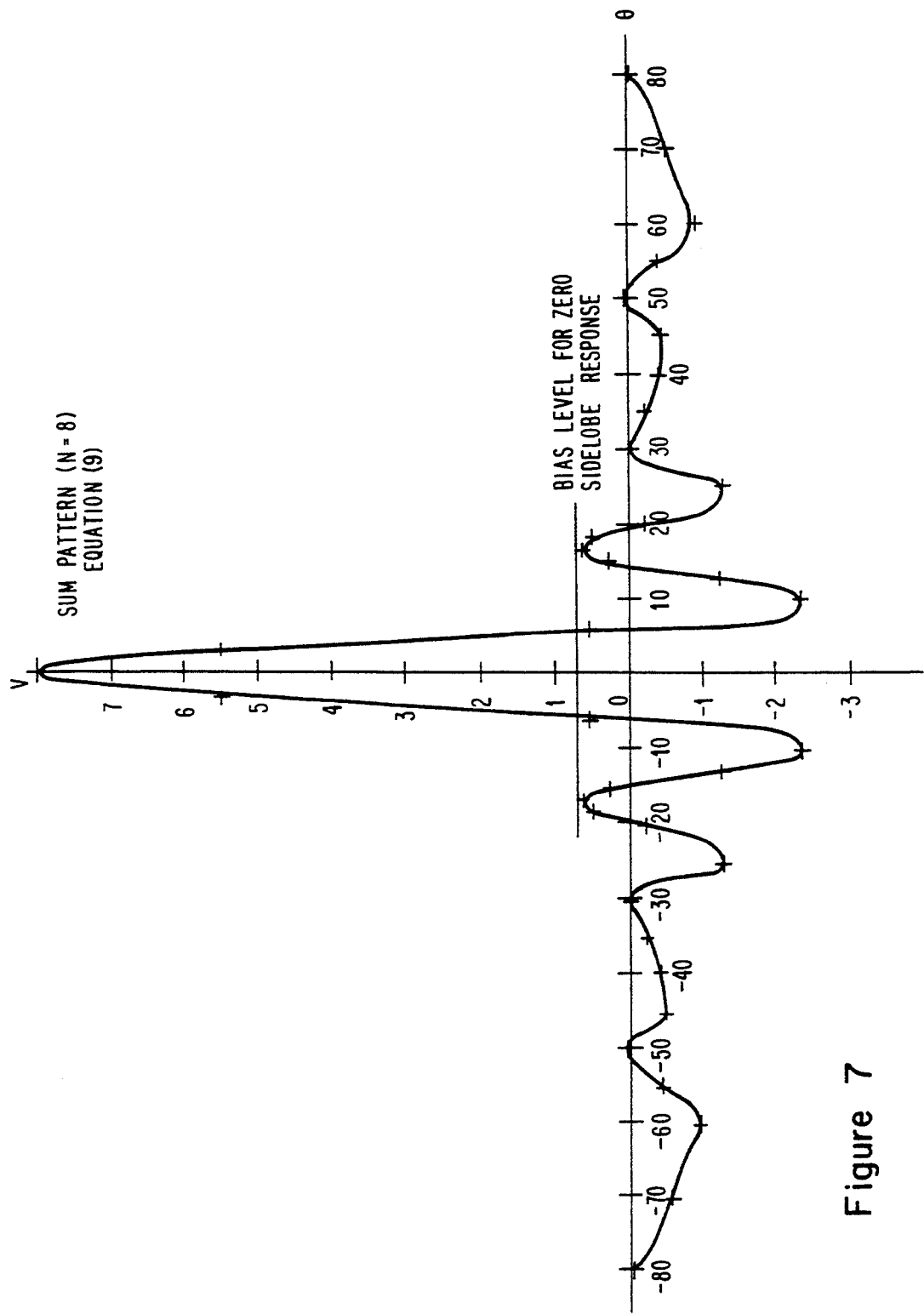
FIG. 7 is a graph of the amplitude response as a function of spatial angle of the output produced by summation of the "real" spatial frequency signal components illustrating how the invention clips off sidelobe responses.

The signals IF$_3$, including derived spatial frequency components, are synchronously detected by detectors 600 and 700. The detectors 600 use a Cosine signal at the same frequency as the IF$_3$ signals, and as a result, the detectors 600 produce baseband signals of a first phase including "real" components of the derived spatial frequency components. The detectors 700 use a Sine signal at the same frequency as the IF$_3$ signals, and as a result, the detectors 700 produce baseband signals of a second phase. The second phase is 90° different from the first phase, and the baseband signals from the detectors 700 include "imaginary" components of the derived spatial frequency components. A summer 800 sums the real components of the signals including the derived spatial frequency components, to provide a single beam output signal. This output signal includes the usual sidelobe responses (see FIG. 7). The output signal from sun, her 800 passes through a linear peak detector 900. The linear peak detector is biased to the peak of the largest even sidelobe, as shown in FIG. 7. As a result of this biasing, only signals within the main lobe of the beam and above the bias level appear in the final output from the detector 900. A summer 850 sums the imaginary components of the signals including the derived spatial frequency components, to produce an error pattern signal.

Figure 4B:
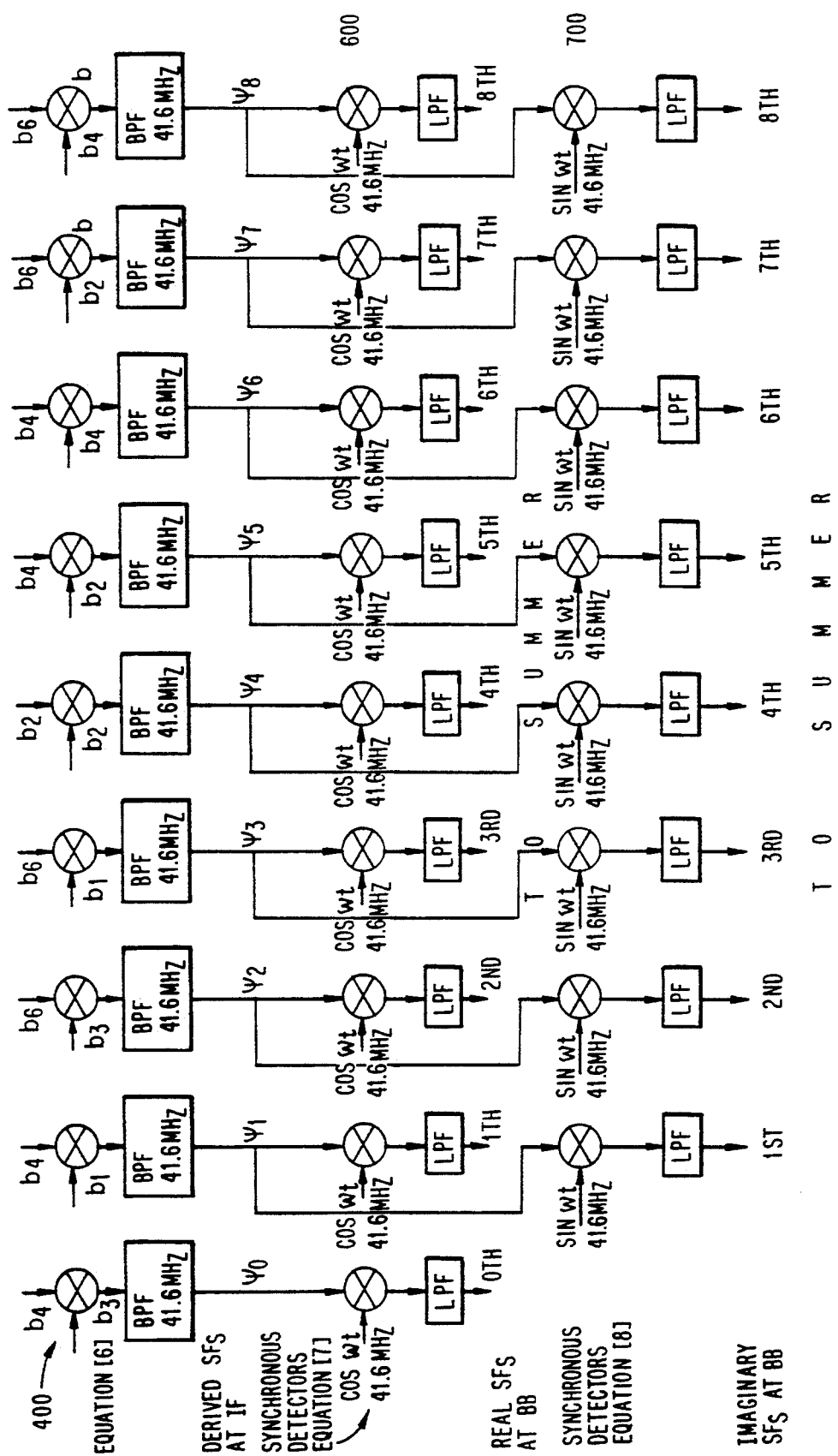

FIGS. 4a and 4b illustrate in more detail the components of the signal processing system of the present invention. The system illustrated processes signals from an antenna array having three elements 1, 2 and 3. This is the smallest array which the signal processor can effectively operate with. This preferred embodiment uses three different LO frequencies. The first IF signals derived by mixing the antenna signals with the signals of the first two LO frequencies are used in the first cross-correlation to produce the signals having sampled spatial frequency components. The signals derived by mixing of the antenna signals with signals of one of the first two LO frequencies are also cross-correlated the IF signals derived by mixing the antenna signals with signal of the third LO frequency. This additional correlation produces signals including modulation arguments which can be summed to produce a signal corresponding to information modulated onto the incoming wavefront, as will be discussed in detail below.

In the array shown in FIG. 4a, the elements 1, 2 and 3 are positioned along a line. In this drawing, the lines s represent constant phase fronts of the incoming electromagnetic wave signal. The incoming wavefronts arrive at the antenna array at an angle $\theta$ with respect to the line formed by the array elements 1, 2 and 3. The angle $\theta$ also corresponds to the angle between a line taken normal to the line of array elements 1, 2 and 3 and a line taken normal to the constant phase wavefronts, and as such the angle $\theta$ represents the direction and degree through which the antenna array should be rotated to target the source of the electromagnetic wave signal.

The three element array forms three actual interferometer pairs. A first actual pair is formed between the first and second elements 1 and 2, a second actual pair is formed between the second and third elements 2 and 3, and a third actual pair is formed between the first and third elements 1 and 3.

As shown at the top of FIG. 4a, a distance D$_1$ of 2λ/2 separates antenna elements 1 and 2, and a distance D$_2$ of 3λ/2 separates antenna elements 2 and 3. The distance between elements 1 and 3 therefore is 5λ/2. When a wavefront s reaches the first antenna element 1, the wavefront s will still be at a distance $2\pi\sin(\theta)$ from the second antenna element 2, and a corresponding phase delay will exist between the received wavefront signals from antenna elements 1 and 2. Similarly, when a wavefront s reaches the second antenna element 2, the wavefront s will still be at a distance $3\pi\sin(\theta)$ from the third antenna element 3, and a corresponding phase delay will exist between the received wavefront signals from antenna elements 2 and 3. Furthermore, when a wavefront s reaches the first antenna element 1, the wavefront s will still be at a distance $5\pi\sin(\theta)$ from the third antenna element 3, and a corresponding phase delay will exist between the received wavefront signals from antenna elements 1 and 3.

Figure 2A:
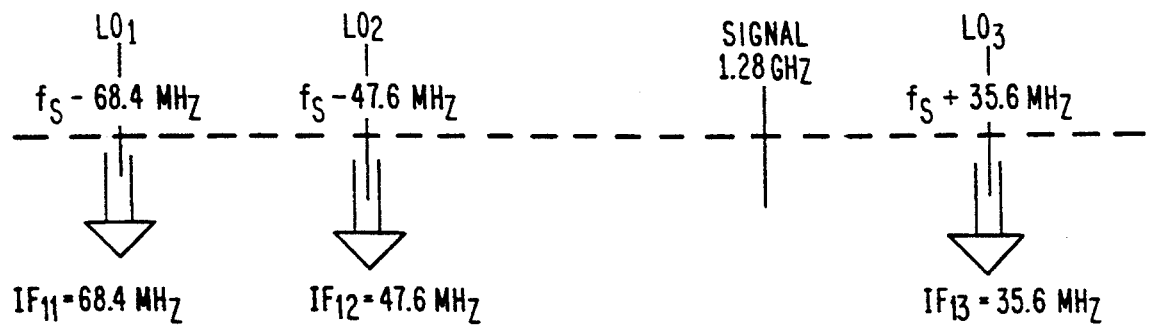
FIG. 2A to 2C the frequency plan for signal processing at various points in the system of the present invention.
Figure 2B:
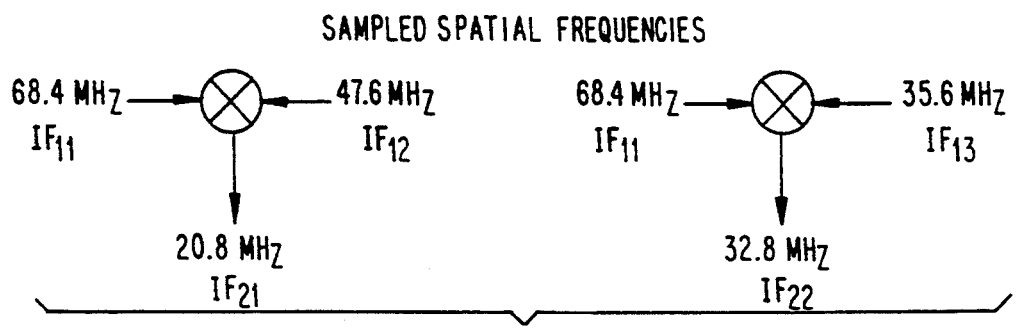
Figure 2C:
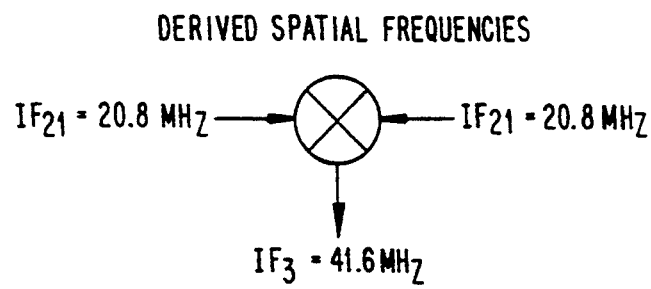
Figure 3:
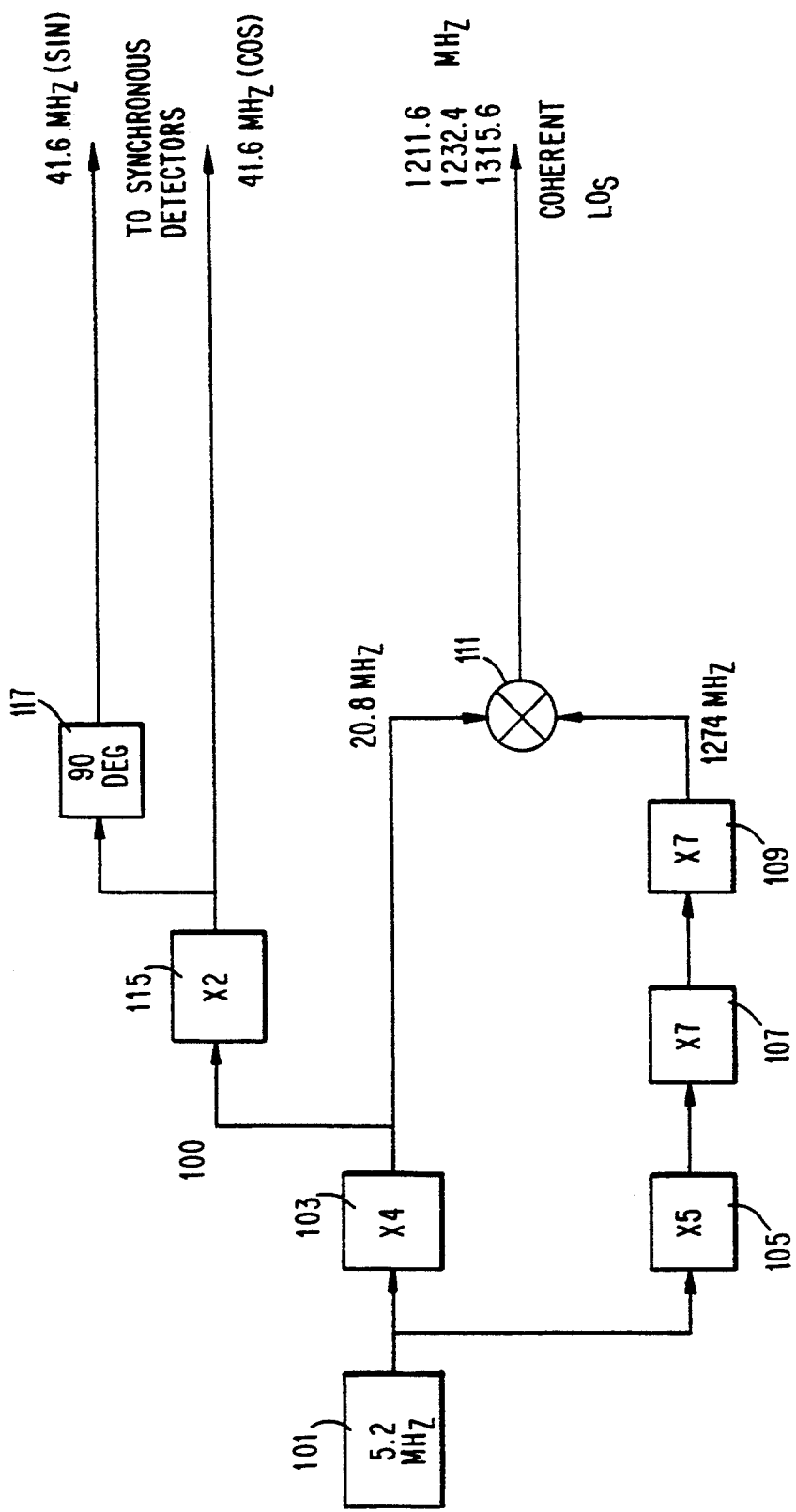
FIG. 3 shows a coherent frequency signal generator for producing the local oscillator signals necessary for operation of the system of the presently preferred embodiment of the invention.

The signals from the left (L) and right (R) antenna elements of each actual interferometer pair, where the center of the pair is taken as the reference, are expressed as follows:

$$V_L = A(\theta)\cos\left[\omega t + \phi(t) - 2\frac{\pi}{\lambda}\frac{D}{2}\sin\theta\right] \quad [1]$$

$$V_R = B(\theta)\cos\left[\omega t + \phi(t) + 2\frac{\pi}{\lambda}\frac{D}{2}\sin\theta\right]$$

where:
A($\theta$)=B($\theta$)=Amplitude of the signal from the respective antenna element
$\omega = 2\pi f$
f=signal frequency
$\phi(t)$=carrier modulation
D=antenna element separation for this interferometer pair
λ=wavelength of the received signal D/λ=spatial frequency argument (aperture variable)
θ=spatial angles, measured from a normal to the array FIGS. 2A to 2C show the frequency plan for processing at various points in the signal processor system; and FIG. 3 shows a coherent frequency signal generator for producing the local oscillator signals used in the preferred embodiments of the processor, particularly the processor shown in FIGS. 4a and 4b. The specific frequencies shown in these drawings and discussed below are exemplary only. The present invention can be easily modified to operate at a variety of other frequencies dependent principally on the frequency of the wavefront signals the antenna array is expected to receive.

FIG. 4a illustrates the components used for RF/IF processing sections 11, 12 and 13 in somewhat more detail. As shown there, the 1.28 MHz signal from each antenna element first passes through an RF amplifier having a gain of 20 and then through a 1.28 MHz bandpass filter. The amplified and filtered signal is then applied to an IF mixer which multiplies that signal by the LO signal containing phase coherent components at the three local oscillator frequencies. The resultant signal is amplified by an IF amplifier providing a further gain of 30. The signal at this point contains IF signal components at the three first IF frequencies. As shown in FIG. 2A, the LO frequencies are chosen to produce $IF_1$ components at 68.4 MHz, 47.6 MHz and 35.6 MHz. A triplexer now processes the signal containing these components to separate these three first intermediate frequency signals. In response to the composite $IF_1$ signal applied to its input, the triplexer will provide the 68.4 MHz $IF_{11}$ signal on one of its outputs, the 47.6 MHz $IF_{12}$ signal on a second of its three outputs and the 35.6 MHz $IF_{13}$ signal on its third output. The triplexer will also filter out any other components resulting from the IF mixing which were present in the signal applied to the triplexer. Each separate IF signal output from the triplexer is amplified with a further gain of 30 and applied to a power divider to provide the number of outputs at the appropriate levels required for processing in subsequent stages.

FIG. 3 shows a generator circuit 100 for producing the signal containing phase coherent components at three local oscillator frequencies, and will be described in detail below. FIG. 2A shows the relationship of the three local oscillator frequencies to the frequency of the received signals. In the illustrated example, the received signal has a frequency $f_s$, for example 1.28 GHz. The selected first local oscillator frequency $LO_1$ is $f_s-68.4$ GHz; the second local oscillator frequency $LO_2$ is selected as $f_s-47.6$ MHz; and the third local oscillator frequency $LO_3$ is selected as $f_s+35.6$ MHz. As illustrated in FIG. 3, the generator 100 includes an oscillator 101 which produces a 5.2 MHz sine wave signal. A frequency multiplier multiplies the frequency of the signal from oscillator 101 by a factor of four to produce a 20.8 MHz signal. The signal from oscillator 101 is also fed successively through frequency multipliers 105, 107 and 109. The frequency multiplier 105 multiplies the frequency of the signal by a factor of 5; and the frequency multipliers 107 and 109 each further multiply the frequency by a factor of 7. The effect of the frequency multipliers 105, 107 nd 109 is to convert the sine wave signal of 5.2 MHz to a sine wave signal of 1274 MHz.

The 1274 MHz signal from frequency multiplier 109 and the 20.8 MHz signal from frequency multiplier 103 are both applied as inputs to a mixer 111. The mixer 111 multiplies the 1274 MHz signal by the 20.8 MHz signal. The resultant signal will include a variety of harmonic signals at frequencies corresponding to a number of sums and differences between the frequencies of the two multiplied signals. The harmonics, however, all will have a phase coherent relationship. Three of the harmonics are chosen to have the desired relationship to the frequency of the incoming signal, as discussed above with regard to FIG. 2A. The other harmonics are removed by appropriate filters (not shown).

Assuming as in the example that the received signal is at a frequency $f_s$ of 1280 MHz (1.28 GHz), the first selected harmonic should be at 1211.6 MHz to correspond to the $LO_1$ frequency of $f_s-68.4$ MHz shown in FIG. 2A, that is 1280 MHz−68.4 MHz=1211.6 MHz. Similarly, the second selected harmonic should be at 1232.6 MHz to correspond to the $LO_2$ frequency of $f_s-47.6$ MHz; and the third selected harmonic should be at 1315.6 MHz to correspond to the $LO_3$ frequency of $f_s+35.6$ MHz. Thus the three harmonics from the output of mixer 111 which are of particular significance here are the harmonic at 1211.6 MHz (1274 MHz−(3×20.8 MHz)), the harmonic at 1232.4 MHz (1274 MHz−(2×20.8 MHz)), and the harmonic at 1315.6 MHz (1274 MHz+(2×20.8 MHz)). The signal including the three phase coherent harmonics at 1211.6 MHz, 1232.4 MHz and 1315.6 MHz serves as the local oscillator signal which is input to the RF/IF processing sections (e.g. 11 to 1N in FIG. 1 or 11 to 13 in FIG. 4). Additional signals produced by generator 100 will be discussed later.

The multiplication of the antenna signal by the signal containing components at the three local oscillator frequencies in each of the RF/IF sections will produce a signal containing three intermediate frequency signals ($IF_1$'s) which are then separated out for further processing by the triplexer. As shown in FIG. 2A, the first intermediate frequency signal produced by the multiplication of the antenna signal by the $LO_1$ component will have an intermediate frequency $IF_{11}$ of 68.4 MHz (the difference between the received signal frequency $f_s$, and the frequency $LO_1$). Similarly, the second intermediate frequency signal produced by the multiplication of the antenna signal by the $LO_2$ component will have an intermediate frequency $IF_{12}$ of 47.6 MHz; and the third intermediate frequency signal produced by the multiplication of the antenna signal by the $LO_3$ component will have an intermediate frequency $IF_{13}$ of 35.6 MHz.

Using Equation [1] as expressions of the antenna element signals of each selected interferometer pair, the first intermediate frequency signals produced by the above discussed IF/RF processing (e.g., at 68.4 MHz, 47.6 MHz and 35.6 MHz) are described by the following expressions: At frequency $IF_{11}$ the signal derived from the first (left) element will be:

$$VL_1 = A(\theta)\cos\left[\omega t + \phi(t) - \pi\frac{D}{\lambda}\sin\theta\right] \times \cos\omega_{LO_1}t$$
$$= \frac{A(\theta)}{2}\cos\left[\omega_{IF_{11}}t + \phi(t) - \pi\frac{D}{\lambda}\sin\theta\right] + \ldots$$

At frequency $IF_{12}$ the signal derived from the first element will be:

$$V_{L2} = A(\theta)\cos\left[\omega t + \phi(t) - \pi\frac{D}{\lambda}\sin\theta\right] \times \cos\omega_{LO2}t$$

$$= \frac{A(\theta)}{2}\cos\left[\omega_{IF12}t + \phi(t) - \pi\frac{D}{\lambda}\sin\theta\right] + \ldots$$

At frequency $IF_{13}$ the signal derived from the first element will be:

$$V_{L3} = A(\theta)\cos\left[\omega t + \phi(t) - \pi\frac{D}{\lambda}\sin\theta\right] \times \cos\omega_{LO3}t$$

$$= \frac{A(\theta)}{2}\cos\left[\omega_{IF13}t - \phi(t) + \pi\frac{D}{\lambda}\sin\theta\right] + \ldots$$

At frequency $IF_{11}$ the signal derived from the second (right) element will be:

$$V_{R1} = B(\theta)\cos\left[\omega t + \phi(t) + \pi\frac{D}{\lambda}\sin\theta\right] \times \cos\omega_{LO1}t$$

$$= \frac{B(\theta)}{2}\cos\left[\omega_{IF11}t + \phi(t) + \pi\frac{D}{\lambda}\sin\theta\right] + \ldots$$

At frequency $IF_{12}$ the signal derived from the second element will be:

$$V_{R2} = B(\theta)\cos\left[\omega t + \phi(t) + \pi\frac{D}{\lambda}\sin\theta\right] \times \cos\omega_{LO2}t$$

$$= \frac{B(\theta)}{2}\cos\left[\omega_{IF12}t + \phi(t) + \pi\frac{D}{\lambda}\sin\theta\right] + \ldots$$

At frequency $IF_{13}$ the signal derived from the second element will be:

[2]

$$V_{R3} = B(\theta)\cos\left[\omega t + \phi(t) + \pi\frac{D}{\lambda}\sin\theta\right] \times \cos\omega_{LO3}t$$

$$= \frac{B(\theta)}{2}\cos\left[\omega_{IF13}t - \phi(t) - \pi\frac{D}{\lambda}\sin\theta\right] + \ldots$$

where $\omega LO_1 < \omega LO_2 < \omega LO_3$. Note that each $\omega LO$ is defined as $2\pi$ times the frequency of the corresponding LO signal. Since the frequencies of $LO_1$ and $LO_2$ were below the frequency of the received signal and the frequency $LO_3$ is above the frequency of the received signal, $\omega LO_1 < \omega LO_2 < \omega < \omega LO_3$ where $\omega$ is $2\pi$ times the frequency $f_s$ of the received signal.

Since all multiplications are non-linear operations, there will be many output terms which are separable by filtering (not specifically shown in the drawings). Only the desired terms are shown.

In the signal notation used in FIG. 4a, the first IF signal at 68.4 MHz ($IF_{11}$) from the first antenna element is signal $a_1$, the first IF signal at 47.6 MHz ($IF_{12}$) from the first antenna element is signal $a_2$, and the first IF signal at 35.6 MHz ($IF_{13}$) from the first antenna is signal $a_3$. The first IF signal at 68.4 MHz ($IF_{11}$) from the second antenna element is signal $a_4$, the first IF signal at 47.6 MHz ($IF_{12}$) from the second antenna element is signal $a_5$, and the first IF signal at 35.6 MHz ($IF_{13}$) from the second antenna is signal $a_6$. The first IF signal at 68.4 MHz ($IF_{11}$) from the third antenna element is signal $a_7$, the first IF signal at 47.6 MHz ($IF_{12}$) from the third antenna element is signal $a_8$, and the first IF signal at 35.6 MHz ($IF_{13}$) from the third antenna is signal $a_9$. These signals $a_1$ to $a_9$ correspond to the signal voltages for the antenna signals converted to signals of the three intermediate frequency, and will be used as the left and right voltages (equation [2]) for interferometer pairings in subsequent processing.

Correlating $V_{L1}$ from the left element and $V_{R2}$ from the right element from an interferometer pair, by multiplying the corresponding first IF signals in one of the mixers 200, the product including the negative function of the sampled SF ($\cos(-2\pi D/\lambda \sin\theta)$) is obtained:

$$PROD1 = V_{L1} \times V_{R2} = \frac{A(\theta)}{2}\cos\left[\omega_{IF11} + \phi(t) - \pi\frac{D}{\lambda}\sin\theta\right] \times \frac{B(\theta)}{2}\cos\left[\omega_{IF12}t + \phi(t) + \pi\frac{D}{\lambda}\sin\theta\right] \quad [3]$$

$$= A_{01}\cos\left[\omega_{IF12}t + \phi(t) - 2\pi\frac{D}{\lambda}\sin\theta\right]$$

where $\omega IF_{21} = \omega IF_{11} - \omega IF_{12}$. (Note that each $\omega$ is defined as $2\pi$ times the frequency of the corresponding IF signal.)

On the other hand, correlating $V_{L2}$ from the left element and $V_{R1}$ from the right element of the same pair, by multiplying the corresponding first IF signals in another of the mixers 200, the product containing the positive function of the sampled SF ($\cos (2\pi D/\lambda \sin\theta)$) is obtained:

$$PROD2 = V_{L2} \times V_{R1} = \frac{A(\theta)}{2}\cos\left[\omega_{IF12}t + \phi(t) - \pi\frac{D}{\lambda}\sin\theta\right] \times \frac{B(\theta)}{2}\cos\left[\omega_{IF11}t + \phi(t) + \pi\frac{D}{\lambda}\sin\theta\right] \quad [4]$$

$$= A_{02}\cos\left[\omega_{IF21}t + \phi(t) + 2\pi\frac{D}{\lambda}\sin\theta\right]$$

Both positive and negative functions of the $D/\lambda$ spatial argument are thus obtainable where the modulation is absent. Bandwidth requirements at $IF_{21}$ are minimal since there is no signal modulation present.

The modulation argument is obtained by correlating $IF_1$'s obtained from LO frequencies chosen on opposite sides of the received signal frequency. Thus by multiplying these selected IF signals in another of the mixers 200 the resultant product is:

$$PROD3 = V_{L1} \times V_{R3} = \frac{A(\theta)}{2} \cos\left[\omega_{IF11}t + \phi(t) - \pi\frac{D}{\lambda}\sin\theta\right] \times \frac{B(\theta)}{2}\cos\left[\omega_{IF13}t - \phi(t) - \pi\frac{D}{\lambda}\sin\theta\right] \quad [5]$$

$$= A_{03}\cos[\omega_{IF3}t - 2\phi(t)]$$

Here, $D/\lambda$ the spatial frequency argument is not present, thus there is no spatial frequency component, but the bandwidth requirement is twice that of the signal modulation.

In a three element antenna array, such as shown in FIG. 4, the first cross-correlation will produce six signals with spatial frequency components corresponding to positive and negative spatial frequencies detected by the three interferometer pairs actually formed by the antenna array. Stated another way, with a three element array, there are actually three interferometer pairs formed. A first pair is formed between the first and second elements 1 and 2, a second pair is formed between the second and third elements 2 and 3, and a third pair is formed between the first and third elements 1 and 3. For each of the three interferometer pairs, the above discussed cross-correlation of intermediate frequency signals produces a pair of product signals, one product signal containing a positive spatial frequency component of an order corresponding to the $D/\lambda$ aperture variable for that pair and the other product signal containing a negative spatial frequency component of that same order.

FIG. 2B shows the frequencies of the signals output by the mixers 200 after the first correlation processing in accord with equations [3], [4] and [5]. In the first pair, antenna element 1 serves as the left element of the current interferometer pair, and antenna element 2 serves as the right element of the current interferometer pair. Thus in FIG. 2B, the correlation shown to the left corresponds to the multiplications performed in Equations [3] and [4]. Specifically, the $V_{L1}$ signal at frequency $IF_{11}$ of 68.4 MHz derived by IF/RF processing of the signal from left antenna element 1 is multiplied by the $V_{R2}$ signal at frequency $IF_{12}$ of 47.6 MHz signal derived by IF/RF processing of the signal from right antenna element 2. In the processor of FIG. 4a, this first multiplication is performed by the left most mixer 200, which mixes the $a_1$ signal and the $a_5$ signal. The resulting product signal has one component corresponding to the PROD1 of equation [3] at 20.8 MHz. The output of the mixer passes through a 20.8 MHz bandpass filter to remove non-essential components, is amplified with a gain of 10 and applied to a power divider to provide the number of outputs at the appropriate levels required for processing in subsequent stages. The resultant signal $b_1$ corresponds to the negative function PROD1 for the first actual interferometer pair formed by antenna elements 1 and 2. Since D for this pair is $2\lambda/2$, the $D/\lambda$ value, and the spatial frequencies occur every one-half wavelength of separation, the first pair measures 2nd order SF's. Thus the $b_1$ signal includes a negative second order sampled spatial frequency component.

Similarly, the $V_{R1}$ signal at frequency $IF_{11}$ of 68.4 MHz derived by IF/RF processing of the signal from right antenna element 2 is multiplied by the $V_{L2}$ signal at frequency $IF_{12}$ of 47.6 MHz signal derived by IF/RF processing of the signal from left antenna element 1. In the processor of FIG. 4a, this second multiplication is performed by the second mixer 200 from the left, which mixes the $a_2$ signal and the $a_4$ signal. The resulting product signal has one component corresponding to the PROD2 of equation [4] at 20.8 MHz. The output of the mixer passes through a 20.8 MHz bandpass filter to remove non-essential components, is amplified with a gain of 15 and applied to a power divider to provide the number of outputs at the appropriate levels required for processing in subsequent stages. The resultant signal $b_2$ corresponds to the positive function PROD2 for the first actual interferometer pair formed by antenna elements 1 and 2 and includes a positive 2nd order spatial frequency component.

Mixers 200 also perform similar cross-correlation of the intermediate frequency signals for the other two interferometer pairs. Thus, in the second pair formed by antenna elements 2 and 3, the second antenna element is now the left element of the pair and the third antenna element 3 is the right element of the pair. Because the spacing D between these elements is $3\lambda/2$, the pair measures 3rd order spatial frequencies. The 68.4 MHz signal $a_4$ derived from the second antenna element 2 is mixed with the 47.6 MHz signal $a_8$ derived from the third element 3. The output from this mixer includes a component corresponding to PROD1 (equation [3]) at 20.8 MHz for the second actual interferometer pair formed by antenna elements 2 and 3. Also, the 47.6 MHz signal $a_5$ derived from the second element 2 is mixed with the 68.4 MHz signal $a_7$ derived from the third antenna element 3. The output from this mixer is PROD2 (equation [4]) at 20.8 MHz for the second actual interferometer pair formed by antenna elements 2 and 3. These 20.8 MHz signals pass through 20.8 MHz bandpass filters to eliminate non-essential components, are amplified and applied to power dividers to provide the number of outputs for each signal at the appropriate levels required for processing in subsequent stages. The resultant signal $b_3$ corresponds to the negative function PROD1, and the resultant signal $b_4$ corresponds to the positive function PROD2, for the second actual interferometer pair formed by antenna elements 2 and 3.

Similarly, in the third pair, the first antenna element 1 is the left element of the pair and the third antenna element 3 is the right element of the pair. Here the spacing D between the elements is $5\lambda/2$, therefore the spatial frequency components are 5th order components. The 68.4 MHz signal $a_1$ derived from the first antenna element 1 is mixed with the 47.6 MHz signal $a_8$ derived from the third antenna element 3. The output from this mixer includes a component corresponding to PROD1 (equation [3]) at 20.8 MHz for the third actual interferometer pair formed by antenna elements 1 and 3. Also, the 47.6 MHz signal $a_2$ derived from the first element 1 is mixed with the 68.4 MHz signal $a_7$ derived from the third antenna element 3. The output from this mixer is PROD2 (equation [4]) at 20.8 MHz for the third actual interferometer pair formed by antenna elements 1 and 3. These 20.8 MHz signals pass through 20.8 MHz bandpass filters to eliminate non-essential components, are amplified and applied to power dividers to provide the number of outputs for each signal at the appropriate levels required for processing in subsequent stages. The resultant signal $b_5$ corresponds to the negative function PROD1, and the resultant signal $b_6$ corresponds to the positive function PROD2, for the second actual interferometer pair formed by antenna elements 1 and 3.

In FIG. 2B the correlation shown to the right corresponds to the multiplication performed in Equation [5]. Specifically, the $V_{L1}$ signal at frequency $IF_{11}$ of 68.4 MHz derived by IF/RF processing of the signal from left antenna element 1 of an interferometer pair is multiplied by the $V_{R3}$ signal at frequency $IF_{13}$ of 35.6 MHz signal derived by IF/RF processing of the signal from right antenna element 2 of the pair in one of the mixers 200. The resulting signal includes a component which corresponds to the product PROD3 of equation [5] which includes the modulation argument. Using the exemplary frequencies illustrated in FIG. 2A to 2C, the PROD3 signal will have a frequency of 32.8 MHz.

The mixers 200 perform this PROD3 (equation [5]) multiplication processing for the first intermediate frequency signals for each of the three interferometer pairs formed by the elements of the antenna array. For example, this multiplication is performed for the first interferometer pair by the first of the three mixers 200 shown to the right of FIG. 4a. This mixer mixes the $a_1$ signal and the $a_6$ signal. The resulting product signal has one component corresponding to the PROD3 of equation [5] at 32.8 MHz. The output of the mixer passes through a 32.8 MHz bandpass filter to remove non-essential components. The resultant signal corresponds to PROD3 containing the modulation argument, for the first actual interferometer pair formed by antenna elements 1 and 2.

A similar multiplication is performed for the second interferometer pair by the middle of the three mixers 200 shown to the right of FIG. 4a. This mixer mixes the $a_4$ signal and the $a_9$ signal. The resulting product signal has one component corresponding to the PROD3 of equation [5] at 32.8 MHz. The output of the mixer passes through a 32.8 MHz bandpass filter to remove non-essential components The resultant signal corresponds to PROD3 containing the modulation argument, for the second actual interferometer pair formed by antenna elements 2 and 3.

Another similar multiplication is performed for the third interferometer pair by the mixer 200 shown at the extreme right of FIG. 4a. This mixer mixes the $a_1$ signal and the $a_9$ signal. The resulting product signal has one component corresponding to the PROD3 of equation [5] at 32.8 MHz. The output of the mixer passes through a 32.8 MHz bandpass filter to remove non-essential components. The resultant signal corresponds to PROD3 containing the modulation argument, for the third actual interferometer pair formed by antenna elements 1 and 3.

The values of PROD3 for the three interferometer pairs can be summed to produce a signal related to the information modulated on the incoming wavefront. As shown in FIG. 4a, the signal processor forms a sum from the three outputs of the three 32.8 MHz bandpass filters. This sum can be expressed as follows:

$$\Sigma(MOD) = \cos(\omega t + 2\phi(t))$$

At this point in the processing of the signals from the three element array, the six second intermediate frequency signals ($IF_2$'s) each contain a component of a different sampled spatial frequency. The sampled spatial frequencies present are the second, third and fifth positive harmonics (+2, +3 and +5) and the second, third and fifth negative harmonics (−2, −3 and −5), as listed in the left column of the table of FIG. 5. With reference to FIG. 4a, the $b_1$ signal contains the −2nd sampled spatial frequency component, and the $b_2$ signal contains the +2nd sampled spatial frequency component. The $b_3$ signal contains the −3rd sampled spatial frequency component, and the $b_4$ signal contains the +3rd sampled spatial frequency component. Similarly, the $b_5$ signal contains the −5th sampled spatial frequency component, and the $b_6$ signal contains +5th sampled spatial frequency component.

Figure 6:
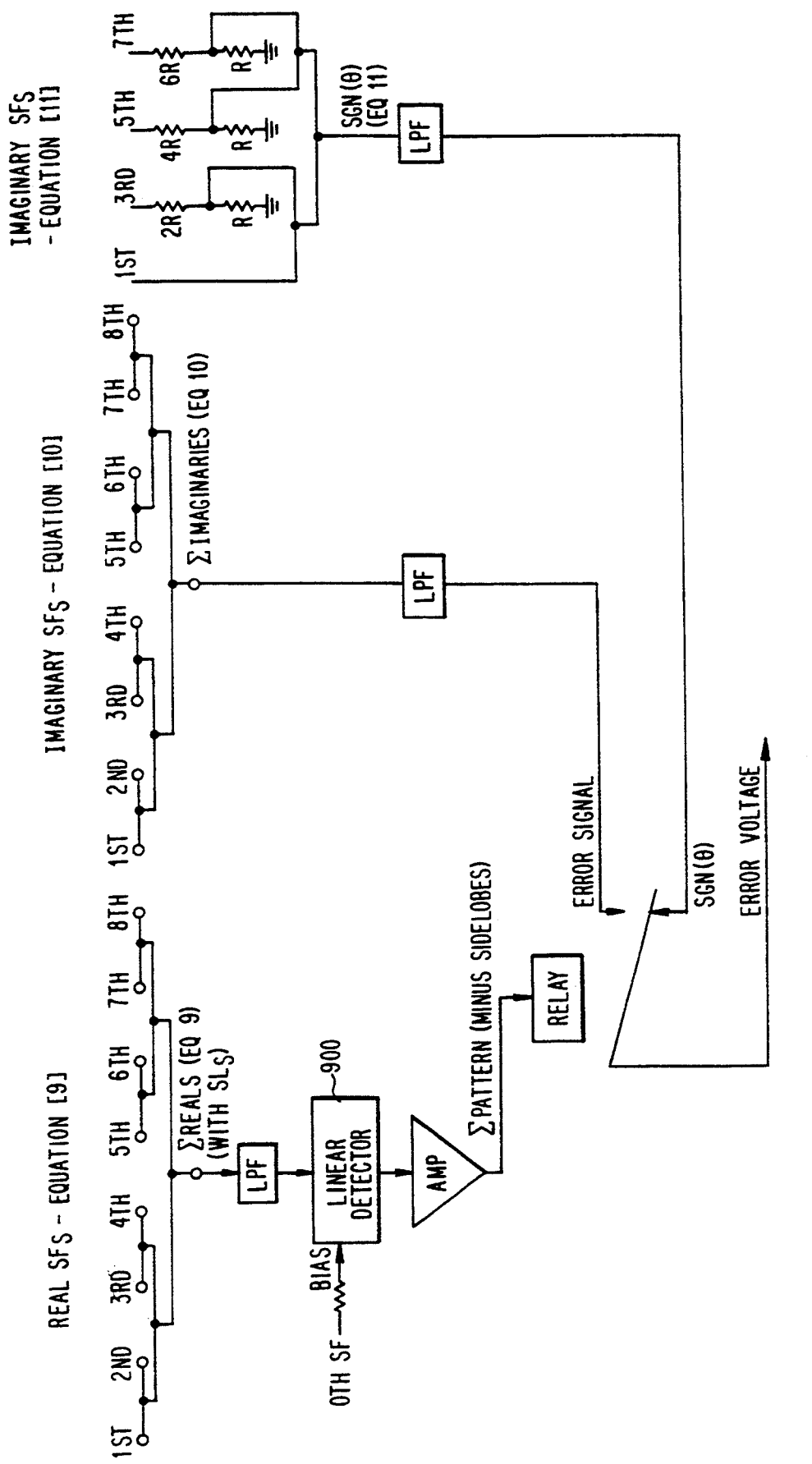
FIG. 6 is a circuit diagram of an error signal selector circuit for use in the present invention.

Since the sampled SF's exist as components in the second intermediate frequency signals $b_1$ to $b_6$, they can be cross-correlated a second time in the mixers 400 using those signals as inputs. For example, using the $b_4$ positive function of equation [4] for $SF_3$, i.e., the phase generated by the $3\lambda/2$ baseline ($D=3\lambda/2$), and the $b_1$ negative function of equation [3] for $SF_2$, i.e., the phase generated by the $2\lambda/2$ baseline ($D=2\lambda/2$) in the second of the mixers 400, an expression containing the positive function of the first SF harmonic is derived:

$$\Psi_1 = A_{02} \cos[\omega_{IF21} t + 3\pi \sin\theta] \times \qquad [6]$$
$$A_{01} \cos[\omega_{IF21} t - 2\pi \sin\theta] = A_1 \cos[\omega_{IF3} t + \pi \sin\theta] + \ldots$$

where $IF_3 = IF_{21} + IF_{21}$, i.e., the upper sideband (FIG. 2B). Similarly, expressions containing all integer SF's from 0 through ±8 can be derived at $IF_3$ by correlating the sampled SF's as listed in FIG. 6 and shown by the connections of mixers 400 in FIG. 4b. For example, $b_3 \times b_4$ produces a signal containing the 0th order SF component, $b_1 \times b_4$ produces a signal containing the 1st order SF component, $b_3 \times b_6$ produces a signal containing the 2nd order SF component, etc. FIG. 6 lists the three sampled SF's obtained from the three element array and the SF's derived from those sampled SF's.

In the example shown in FIG. 4b, the products of the second cross-correlation output by the mixers 400 include components at 41.6 MHz which include the derived spatial frequency components for the non-existent interferometers pairs. These mixer outputs are each filtered through a 41.6 MHz bandpass filter to eliminate unnecessary components. FIG. 2C illustrates this frequency relationship. The output of the left most mixer 400 and the associated bandpass filter would include the $0^{th}$ order component in the 41.6 MHz signal corresponding to the product of the $b_3$ and $b_4$ signals, the output of the next one of the mixers 400 and the associated bandpass filter would include the positive $1^{st}$ order component in the 41.6 MHz signal corresponding to the product of the $b_1$ and $b_4$ signals (equation [6]), etc. Thus, all integer SF's from 0 through N can be derived at $IF_3$, Equations [3] and [4] represent phase modulation of -q the carrier in the $\theta$ plane, differing from the amplitude modulation in the $\theta$ plane obtained when the SF's are summed in the conventional manner, i.e., as in conventional antennas. It is this characteristic that leads to elimination of sidelobe responses and to the generation of error signals.

In addition to the phase coherent signal comprising the three local oscillator frequency signals for use by the RF/IF processing sections, the generator 100 in FIG. 3 produces Sine and Cosine signals (same frequency but 90° out of phase) for use by the synchronous detectors.

The derived SF's are synchronously detected, i.e., phase compared, which translates each to baseband. As shown in FIG. 4b, the synchronous detectors 600 phase compare these mixer outputs to a cosine signal at 41.6 MHz. Similarly, the synchronous detectors 700 phase compare these mixer outputs to a sine signal at 41.6 MHz. The sine and cosine signals have a 90° difference in their relative phases. As a result, the outputs of the synchronous detectors 600 include spatial frequency components referred to as "real" components, and the synchronous detectors 700 include spatial frequency components referred to as "imaginary" components.

To produce the signals for use in the synchronous detectors, the generator 100 further includes another frequency multiplier 115 and a 90° phase shift circuit 117. The 20.8 MHz signal from frequency multiplier 103 is applied to the frequency multiplier 115. The resultant signal has a frequency of 41.6 MHz and will be used by the synchronous detectors as the Cosine signal. The 41.6 MHz frequency signal from multiplier 115 also is applied to the 90° phase shift circuit 117. The 90° shifted signal at 41.6 MHz serves as the Sine signal for use by the synchronous detectors.

The baseband signals output from the synchronous detectors 600 and 700 are low pass filtered to remove any unnecessary components to produce signals corresponding to the following expressions:

$$\cos\left(\omega_{IF3}t + 2\pi \frac{D}{\lambda} \sin\theta\right) \cos\omega_{IF3}t = \cos\left(2\pi \frac{D}{\lambda} \sin\theta\right) + \ldots \quad [7]$$

(real SF's)

$$\cos\left(\omega_{IF3}t + 2\pi \frac{D}{\lambda} \sin\theta\right) \sin\omega_{IF3}t = \sin\left(2\pi \frac{D}{\lambda} \sin\theta\right) + \ldots \quad [8]$$

(imaginary SF's)

After the low pass filtering, the baseband signals corresponding to expressions [7] and [8] for each of the derived spatial frequencies are then applied to the appropriate summers (not shown in FIG. 4b). Recall from the discussion of FIG. 1 above, that the summer 800 sums the "real" component signals from the synchronous detectors 600 and the summer 850 sums the "imaginary" component signals from the synchronous detectors 700. The results of these summations are:

$$\text{Sum} = \sum_{n=1}^{N} \cos\left(2\pi n \frac{Do}{\lambda} \sin\theta\right) = \quad [9]$$

$$\frac{\sin[N\gamma/2]\cos[(N+1)(\gamma/2)]}{\sin \gamma/2}$$

$$\Delta = \sum_{n=1}^{N} \sin\left(2\pi n \frac{Do}{\lambda} \sin\theta\right) = \quad [10]$$

$$\frac{\sin[N\gamma/2]\sin[(N+1)(\gamma/2)]}{\sin \gamma/2}$$

where the Sum is the single beam output signal and $\Delta$ is the error pattern signal.

The signals produced by the processor can also produce an error function signal represented by a signum function (sgn) of the angle $\theta$. As shown in the upper right corner of FIG. 6, the baseband signals from those detectors 700 which produce signals containing imaginary SF components for the odd harmonic spatial frequencies are applied to a resistor network. The resisters of the network, having the relative values shown, provide a weighting of each of these signals which is inversely proportional to the SF harmonic number of each signal. A low pass filter removes any unnecessary components from the resultant sum signal.

Summing only the signals containing odd imaginably SF's from [8] with amplitudes that are inversely proportional to the harmonic number, as weighted by the illustrated resistor network, this error function is:

$$\text{sgn}(\theta) = \sum_{n=1}^{4} \frac{1}{2n-1} \sin\left[(2n-1)2\pi \frac{Do}{\lambda} \sin\theta\right] \quad [11]$$

where $$\gamma = 2\pi \frac{Do}{\lambda} \sin\theta$$

$Do$ = spacing of lowest harmonic pair ($\lambda/2$).

Note that depending on $\theta$, there are both positive and negative values obtained from each of these equations. Equation [9] produces a sum pattern with a positive max at $\theta=0°$, negative odd-numbered sidelobes and positive even-numbered sidelobes (FIG. 7). By passing this sum pattern through the linear detector 900, biased to the peak of the highest valued even sidelobe, all sidelobe responses are eliminated. Automatic biasing can be supplied by the 0th harmonic which has no amplitude or phase variation as a function of spatial angle but whose amplitude varies with signal level.

Figure 8:
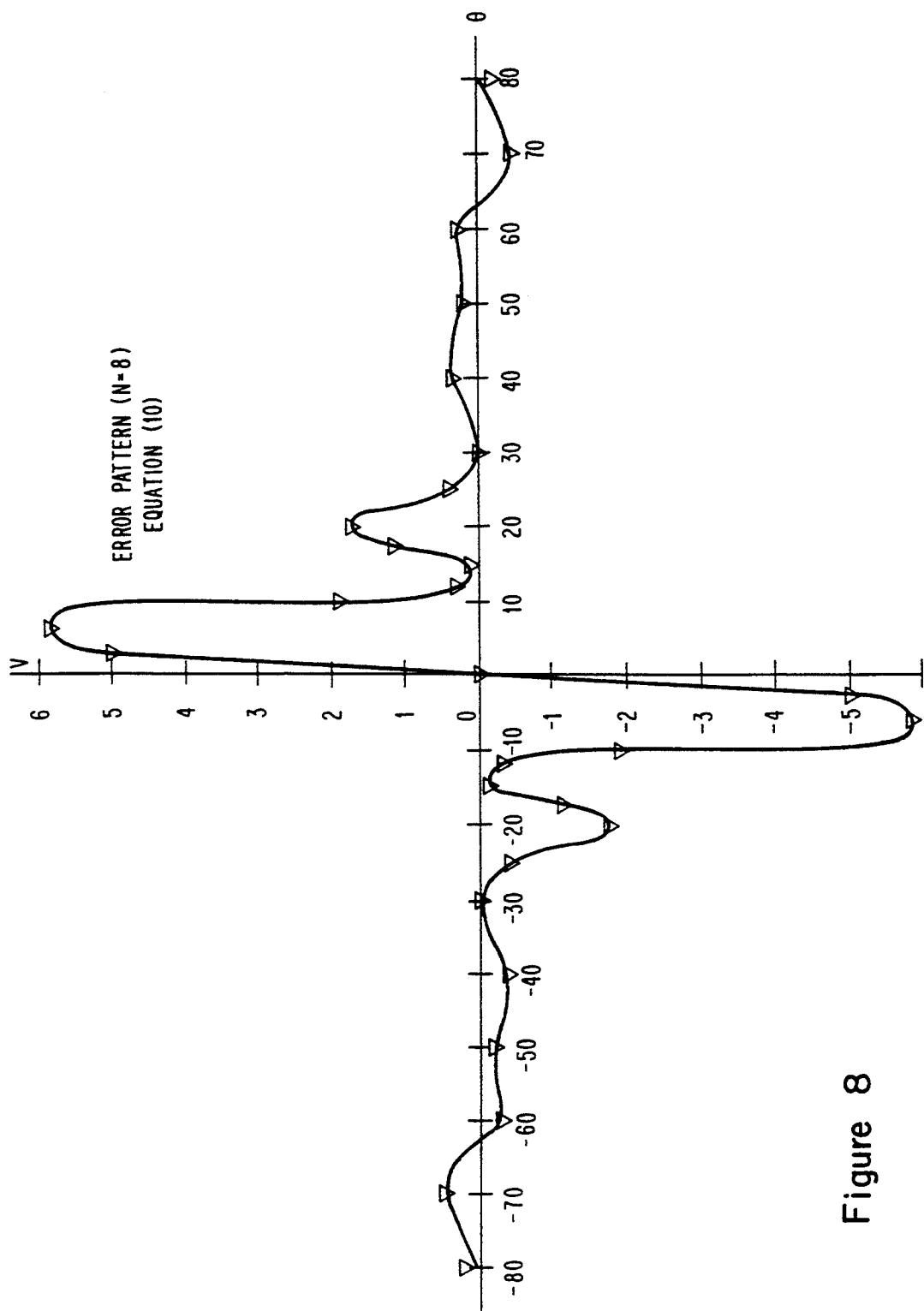
FIG. 8 is a graph of the amplitude response of the output produced by summation of the "imaginary" spatial frequency signal components illustrating how the invention derives error pattern signals.

Equation [10] results in an error pattern with a value of 0 at $\theta=0°$, rapidly becoming positive for $\theta>0°$ and rapidly becoming negative for $\theta<0°$ (FIG. 8).

Figure 9:
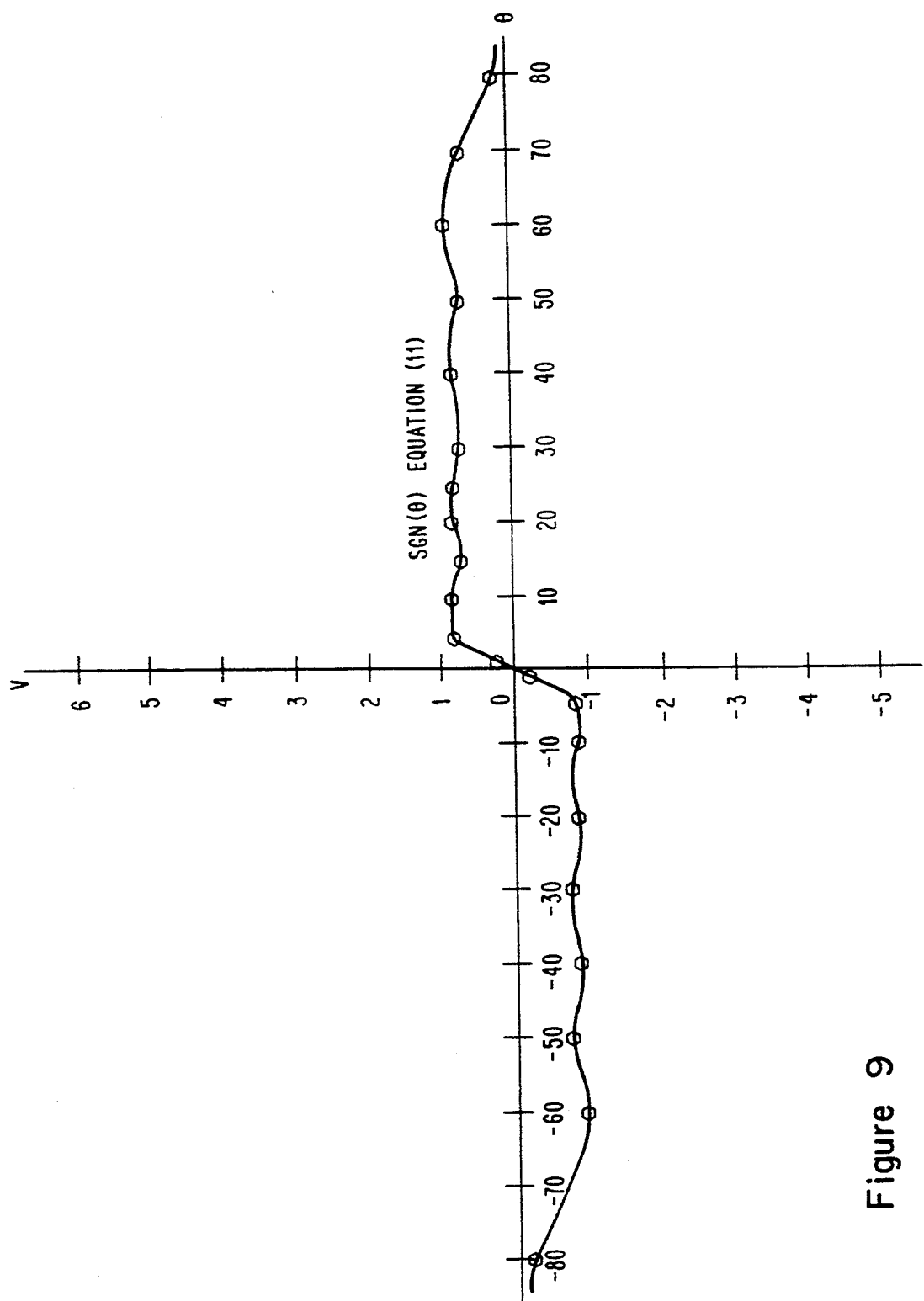
FIG. 9 is a graph of the amplitude response of showing the effect of summation of the odd harmonics of the spatial frequency signals to produce an alternate form of error signal.

Equation [11] produces an output which approximates the signum function of the angle, referred to as the sgn($\theta$) function, which is uniformly positive for all angles in the range $0°<\theta<80°$ and uniformly negative for all angles in the range $-80°<\theta<0°$. For n=4 (SF's=1, 3, 5, 7), the output value is about $\pm(0.8\pm0.1)$ for $\theta$ in the range $\pm(5°$ to $70°)$ and $\pm0.2$ for $\theta=80°$ (FIG. 9).

Error signals are useful for pointing systems in the direction of signal sources. The sgn($\theta$) function corresponding to equation [11] is useful over a wide range of angles for such a purpose because it is uniformly positive for positive $\theta$ and uniformly negative for negative $\theta$(FIG. 9). The slope of that function at $\theta=0°$, however, is relatively small. Thus, the sgn($\theta$) function can be used effectively to control the direction of motion of a platform on which the antenna array is mounted, to change the antenna angle to point toward the wavefront source, for angles outside the $\pm5°$ region.

In contrast, the slope of the error pattern is very steep at $\theta=0°$ (FIG. 8), thereby providing a more accurate and stable pointing source. The error pattern corresponding to equation [10], on the other hand, has zeros in its response pattern at the wider angles (FIG. 8), making it unsuitable for tracking at those angles. In the region from $-5°$ to $+5°$, the error pattern signal is positive when the angle is positive and negative when the angle is negative. In this region, the error pattern signal formed by the sum of the signals containing imaginary components therefore can be used to control the direction of motion of a platform on which the antenna array is mounted.

The single beam output signal provides an indication of when the antenna is aimed at the signal source. As the platform on which the antenna array is formed scans, when the array is positioned so that the angle is substantially zero (e.g. ±5°) the single beam output signal reaches a peak, as shown in FIG. 7. This signal, with the sidelobes removed by the linear peak detector, can be used to switch a relay or other circuit element based on whether or not the antenna is pointed essentially in a direction toward the source of the received signal.

FIG. 6 shows a circuit for selecting the between sgn(θ) function and the error pattern signal to output the proper source of error signal, based on the level of the signal output by the linear peak detector. As shown, the single beam output signal, with sidelobe responses eliminated by the peak detector 900, is amplified and applied to the control terminal of a relay. The relay selectively outputs either the sgn(θ) function signal or the error pattern signal. The relay is normally positioned to output the sgn(θ) function signal. Thus, for a signal arriving from any arbitrary direction, the angle is outside the ±5° region. As a result, the single beam signal is in a low level sidelobe region (FIG. 7) and below the bias level of the peak detector, and therefore the peak detector outputs a low level. The relay remains in its normal position and outputs the sgn(θ) function, which provides a voltage for pointing a system to within ±5° of a signal source. As the antenna position changes to bring the angle within the ±5°, the sum of signals having real components produces a single beam output signal above the peak detector's bias level and the peak detector produces a high level output. This high output switches the relay to change the error source from the sgn(θ) signal to the error pattern function signal. The error pattern function signal then provides an accurate and stable source for fine pointing within the regions of −5° to +5°.

From the above detailed description it becomes clear that the signal processing techniques of the present invention derive error signals and a single beam output signal without sidelobe responses from a thinned antenna array. The error signals and the resultant single beam output signal provide accurate indications of the angle of incoming wavefront signals and are useful as control signals for accurately controlling tracking of a signal source by an antenna. One example of a source which the antenna array and signal processor of the invention can track is a satellite orbiting over a position at which a person is operating a personal communications terminal which incorporates the array and signal processor.

I claim:

1. A signal processor for eliminating sidelobe responses from signals produced by an antenna array of spaced antenna elements, said signal processor comprising:

means for converting a received wavefront signal from each antenna element of the antenna array to a signal of a first intermediate frequency and a signal of a second intermediate frequency;

first cross-correlating means for cross-correlating the first intermediate frequency signal from each element with the second intermediate frequency signal of each of the other array elements to form signals containing sampled spatial frequency components;

second cross-correlating means for cross-correlating selected pairs of the signals containing sampled spatial frequency components to produce signals containing derived spatial frequency components;

means, responsive to the signals containing derived spatial frequency components, for deriving a single beam output signal which varies as a function of an angle of incidence of the wavefront received by the array; and means for eliminating sidelobe responses from the single beam output signal.

2. A signal processor as in claim 1, wherein the means for converting the wavefront signals comprise:

a phase coherent local oscillator producing a local oscillator signal containing phase coherent components of at least two different frequencies; and multipliers for multiplying the local oscillator signal with the received wavefront signal from each element of the antenna array.

3. A signal processor as in claim 1, wherein the first cross-correlating means comprises a set of mixers, each of the mixers of said set receiving and multiplying together:

(i) the first intermediate frequency signal produced from the wavefront signal from one of the antenna elements, and (ii) the second intermediate frequency signal produced from the wavefront signal from another of the antenna elements.

4. A signal processor as in claim 1, wherein the means for deriving a single beam output signal comprises:

means for synchronously detecting the signals containing derived spatial frequency signal components; and means for summing the synchronously detected signals to provide said single beam output signal.

5. A signal processor as in claim 1, wherein the means for eliminating sidelobe responses comprises a linear peak detector responsive to the single beam output signal, the linear peak detector being biased to the peak of the largest even sidelobe of said single beam output signal such that only signals within a central lobe of the single beam output signal and above the bias level are passed through the linear peak detector to form a final output of the signal processor.

6. A signal processor as in claim 1, further comprising:

means for deriving signals containing imaginary spatial frequency components from the signals containing derived spatial frequency components; and means, responsive to the signals containing imaginary spatial frequency components, for deriving an error signal which varies as a function of said angle of incidence.

7. A signal processor as in claim 6, wherein:

the means for deriving a single beam output signal comprises first synchronous detector means for synchronously converting the signals containing derived spatial frequency components to corresponding baseband signals of a first phase; and the means for deriving signals containing imaginary spatial frequency components comprises second synchronous detector means for synchronously converting the signals containing derived spatial frequency components to corresponding baseband signals of a second phase, said second phase being 90° different from said first phase.

8. A signal processor as in claim 7, wherein:

the first synchronous detector means comprises means for multiplying the signals containing derived spatial frequency components from the second cross-correlating means by a Cosine signal at a predetermined frequency; and the second synchronous detector means comprises means for multiplying the signals containing derived spatial frequency components from the second cross-correlating means by a Sine signal at said predetermined frequency.

9. A signal processor as in claim 7, wherein the means for deriving an error signal comprises means for summing the baseband signals of the second phase to produce an error pattern signal.

10. A signal processor as in claim 7, wherein the means for deriving an error signal comprises means for summing selected ones of the baseband signals of the second phase, said selected ones of the baseband signals of the second phase including only odd order imaginary components of the derived spatial frequencies such that the sum produces a signal approximating a signum function of said angle of incidence.

11. A signal processor as in claim 10, wherein the means for deriving an error signal further comprises:
means for summing the baseband signals of the second phase to produce an error pattern signal which varies as a function of the angle of incidence; and
means for selectively outputting either the signal approximating a signum function or the error pattern signal based on the level of the single beam output signal from which sidelobe responses have been eliminated.

12. A signal processor as in claim 10, wherein the means for deriving an error signal further comprises means for weighting each of the selected ones of the baseband signals by a factor inversely proportional to the odd order of the corresponding imaginary component of the derived spatial frequency prior to application of the selected ones of the baseband signals to the means for summing.

13. A signal processor for eliminating sidelobe responses from signals produced by an antenna array of spaced antenna elements that forms a single beam, said signal processor comprising:
a phase coherent local oscillator producing a local oscillator signal containing phase coherent components of three different frequencies;
means, responsive to the local oscillator signal and to a received wavefront signal from each element of the antenna array, for simultaneously converting the received wavefront signal from each element of the antenna array to signals of three different intermediate frequencies;
first cross-correlating means comprising means for cross-correlating signals of a first one of the intermediate frequencies from each antenna element with signals of a second one of the intermediate frequencies from each of the other array elements to form signals containing sampled spatial frequency components;
second cross-correlating means for cross-correlating selected pairs of the signals containing sampled spatial frequency components to produce signals containing derived spatial frequency components;
means for synchronously detecting the signals containing derived spatial frequency components;
means for summing the synchronously detected signals to provide a single beam output signal; and
a linear peak detector responsive to the single beam output signal; wherein the linear peak detector is biased to the peak of the largest even sidelobe of the single beam output signal such that only signals within a central lobe of the beam output signal and above the bias level appear in the final output of the signal processor.

14. A signal processor as in claim 13, wherein the phase coherent local oscillator comprises means for producing a signal containing phase coherent components of the three different frequencies, two of the three frequencies being below the frequency of the received wavefront signals from the antenna elements of the array and one of the local oscillator frequencies being above the frequency of signals from the antenna elements of the array.

15. A signal processor as in claim 13, wherein the means for simultaneously converting the received wavefront signal from each element of the antenna array to signals of three different intermediate frequencies comprises multipliers for multiplying the local oscillator signal with the received wavefront signal from each element of the spaced antenna array.

16. A signal processor as in claim 13, wherein:
the first correlating means further comprises means for cross-correlating signals of the third one of the intermediate frequencies from selected ones of the antenna elements with the signals of either the first or the second of the intermediate frequencies from other selected ones of the antenna elements, to produce a modulation argument signal for the received wavefront signal from each antenna element,
said signal processor further comprising means for summing the modulation argument signals to produce a signal representative of information modulated on a wavefront received by said antenna array.

17. A signal processor as in claim 13, further comprising:
means for deriving signals containing imaginary spatial frequency components from the signals containing derived spatial frequency components; and
means, responsive to the signals containing derived imaginary spatial frequency components, for deriving an error signal.

18. A method of signal processing for eliminating sidelobe responses from signals produced by an antenna array of spaced antenna elements, said method comprising the steps of:
processing received wavefront signals from pairs of elements of the antenna array to produce signals containing sampled spatial frequency components;
cross-correlating selected pairs of the signals containing sampled spatial frequency components to produce signals containing derived spatial frequency components;
detecting the signals containing derived spatial frequency components;
summing signals produced by said detecting to provide a single beam output signal; and
detecting a peak portion of the single beam output signal which is above a threshold level, said threshold level being such that any sidelobe responses are eliminated.

19. A signal processor for producing an error signal from signals produced by an antenna array of spaced antenna elements, said signal processor comprising:
means for converting a received wavefront signal from each antenna element of the antenna array to a signal of a first intermediate frequency and a signal of a second intermediate frequency;

first cross-correlating means for cross-correlating the first intermediate frequency signal from each element with the second intermediate frequency signal from each of the other array elements to form signals containing sampled spatial frequency components;

second cross-correlating means for cross-correlating selected pairs of the signals containing sampled spatial frequency components to produce signals containing derived spatial frequency components;

means for deriving signals containing imaginary spatial frequency components from said signals containing derived spatial frequency components; and means for forming the error signal from the signals containing imaginary spatial frequency components, said error signal varying as a function of an angle of incidence of the wavefront received by the array.

20. A signal processor as in claim 19, wherein the means for deriving signals containing imaginary spatial frequency components comprises a synchronous detector for synchronously converting the signals containing derived spatial frequency components to corresponding baseband signals and introducing a 90° phase shift.

21. A signal processor as in claim 20, wherein the means for deriving an error pattern signal comprises means for summing the 90° phase shifted baseband signals.

22. A signal processor as in claim 19, wherein the means for deriving an error signal comprises means for summing selected ones of the signals containing imaginary spatial frequency components, the selected signals including only odd order imaginary components of the derived spatial frequencies such that the sum produces a signal approximating a signum function of said angle of incidence.

23. A signal processor as in claim 22, wherein the means for deriving an error signal further comprises:

(i) means for summing all of the signals containing imaginary spatial frequency components to produce an error pattern signal which varies as a function of the angle of incidence; and (ii) means for selectively outputting either the signal approximating a signum function or the error pattern signal.

24. A signal processor as in claim 22, wherein the means for deriving an error signal further comprises means for weighting each of the selected signals by a factor inversely proportional to the odd order of the corresponding imaginary component of the derived spatial frequency prior to application of the selected signals to the means for summing.

25. A signal processing method for producing an error signal from signals produced by an antenna array of spaced antenna elements, said method comprising the steps of:

processing received wavefront signals from all antenna elements of the antenna array to form signals containing sampled spatial frequency components corresponding to actual interferometer pairs formed by the elements of the array;

cross-correlating selected pairs of the signals containing sampled spatial frequency components to produce signals containing derived spatial frequency components;

deriving signals containing imaginary spatial frequency components from said signals containing derived spatial frequency components; and forming the error signal from the signals containing imaginary spatial frequency components.

26. A signal processing method as in claim 25, wherein the step of forming the error signal comprises summing all of the signals containing imaginary spatial frequency components.

27. A signal processing method as in claim 25, wherein the step of forming the error signal comprises summing only signals containing odd ordered ones of the imaginary spatial frequency components.

* * * * *